United States Patent
Gerstenberger et al.

(10) Patent No.: US 8,514,694 B2
(45) Date of Patent: Aug. 20, 2013

(54) METHOD AND ARRANGEMENT IN A TELECOMMUNICATION SYSTEM

(75) Inventors: Dirk Gerstenberger, Stockholm (SE); Stefan Parkvall, Stockholm (SE); Per Beming, Stockholm (SE); Erik Dahlman, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 854 days.

(21) Appl. No.: 12/439,286

(22) PCT Filed: Aug. 27, 2007

(86) PCT No.: PCT/EP2007/007495
§ 371 (c)(1),
(2), (4) Date: Jun. 11, 2009

(87) PCT Pub. No.: WO2008/025506
PCT Pub. Date: Mar. 6, 2008

(65) Prior Publication Data
US 2010/0008310 A1    Jan. 14, 2010

(30) Foreign Application Priority Data
Aug. 28, 2006   (SE) ...................................... 0601769

(51) Int. Cl.
*H04J 11/00*   (2006.01)
(52) U.S. Cl.
USPC .......... 370/208; 370/329; 370/341; 455/450; 455/45; 455/422.1

(58) Field of Classification Search
USPC ................ 370/208, 329, 341, 480; 455/450, 455/509, 561, 550, 556.2, 45, 422.1
See application file for complete search history.

(56) References Cited

U.S. PATENT DOCUMENTS

| | | | |
|---|---|---|---|
| 7,756,521 B2 * | 7/2010 | Gerlach et al. | 455/450 |
| 2004/0218523 A1 * | 11/2004 | Varshney et al. | 370/208 |
| 2005/0220002 A1 * | 10/2005 | Li et al. | 370/208 |
| 2006/0117363 A1 * | 6/2006 | Lee et al. | 725/106 |

FOREIGN PATENT DOCUMENTS

EP   1526674 A1   4/2005

OTHER PUBLICATIONS

Motorola. "EUTRA SC-FDMA Uplink Resource Block, Resource Allocation and Pilot/Reference Signal Design & TP." R1-060246, 3GPP TSG RAN1 LTE Ad Hoc, Helsinki, Finland, Jan. 23-25, 2006.

* cited by examiner

*Primary Examiner* — Dady Chery
(74) *Attorney, Agent, or Firm* — Coats & Bennett, P.L.L.C.

(57) ABSTRACT

A network informs a user equipment about the number of usable sub-carriers in a frequency spectrum. Based on this, and its knowledge of a generic size of a resource block, the user equipment is able to determine a number of sub-carriers that are to be allocated to one or more fractional resource blocks. Rules, which may be predefined in the standard, or may be signalled to the user equipment, allow the user equipment to determine which of the usable sub-carriers should be allocated to the fractional resource block or blocks.

20 Claims, 3 Drawing Sheets

METHOD AND ARRANGEMENT IN A TELECOMMUNICATION SYSTEM

TECHNICAL FIELD

The present invention relates to methods and arrangements in a telecommunication system, in particular to methods and arrangements for a physical resource block allocation scheme for various spectrum allocations.

BACKGROUND

3 G Long Term Evolution (LTE) is currently standardized in by the 3rd Generation Partnership Project (3 GPP) and features a downlink radio access that is based on Orthogonal Frequency Division Multiplex (OFDM) and an uplink radio access based on Single Carrier Frequency Division Multiple Access (SC-FDMA).

The scalability of the physical layer radio access scheme in order to fit various existing and future spectrum allocations is a key advantage of LTE. In other words, one and the same physical layer specification should be easily adaptable to various spectrum or bandwidth allocations throughout the world simply by using a different parametrization of key parameters (mainly the FFT size). This allows for economies of scale with respect to chip set design.

The OFDM-based downlink consists of a number of evenly spaced narrow-band sub-carriers that are allocated for data transmission ("used sub-carriers") within a defined spectrum or bandwidth allocation.

In order to structure the physical layer resource handling, physical resource blocks are defined consisting each of a given number of, e.g., adjacent sub-carriers. Hence, the total number of subcarriers used within a given spectrum allocation is an integer multiple of the number of sub-carriers contained in one physical resource block. The current assumption in 3 GPP is that each sub-carrier is 15 kHz wide, and that one resource block contains 25 subcarriers. Hence, for a 5 MHz bandwidth allocation assuming 10% guard band on the edges, a total of 12 resource blocks containing a total of 300 sub-carriers is the current assumption in 3 GPP.

Regulatory requirements demand that the transmitted signals from radio equipment operating in 3 G/LTE spectrum allocations comply with specific spectrum masks that are, or will be defined for each existing or future spectrum allocation. As a consequence the amount of needed guard band—which is directly reducing the number of used sub-carriers—will vary depending on individual spectrum mask requirements and impairments on the radio front end. A simple and straight-forward measure to circumvent this problem would be, e.g., to reduce the number of sub-carriers in each resource block. For instance, applying 24 instead of 25 sub-carriers results in 288 used subcarriers (12 resource blocks each with 24 subcarriers) within 5 MHz. However, although such a reduction of subcarriers may be sufficient to fulfil the spectrum mask requirements in a 5 MHz spectrum allocation, it is far from clear that a different spectrum allocation can be efficiently utilized using an integer number of resource blocks with the same resource block size as for the 5 MHz spectrum allocation (due to reasons of the scalability). As a consequence, spectrum mask and impairments might, e.g., allow for 3.125 resource blocks (with 24 subcarriers each) to be used in a 1.25 MHz allocation, resulting in a waste of 0.125 resource blocks (i.e. 4% of the usable bandwidth). Even worse, if spectrum mask requirements and impairments require slightly more than 10% guardband and the resource block size of 25 subcarriers would be maintained, then slightly less than 3 resource blocks could be fitted into a 1.25 MHz spectrum allocation, leading to a waste of almost ⅓ of the usable bandwidth.

Furthermore, existing solutions of defining a number of fixed spectrum allocations, each with a certain number of resource blocks, are inflexible with respect to future spectrum allocations, for example when assuming spectrum allocations of size 1.25, 2.5, 5, 10, 15, and 20 MHz for LTE and basing the resource block sizes upon these number. However, future demands for other spectrum allocations, e.g. 7 MHz, would require revisions of the physical layer specification, which is disadvantageous.

Thus, a more flexible scheme would result in a generic description of the air interface and only the relevant specifications covering testing and RF requirements need to be updated when additional spectrum allocations are defined.

The present invention relates to techniques that allow for the definition of a generic physical layer definition with a resource block allocation scheme that supports various bandwidth allocations. It relates to a method and arrangement for allocating physical layer resource blocks whilst enabling unambiguous initial access procedures for radio cells.

Embodiments of the present invention thus allow support of a generic physical layer specification that makes both the standard and implementations easily extendable to various existing and future spectrum allocations. This is achieved by a method and arrangement that arranges resource blocks in such a way that a generic resource block size is maintained for all spectrum allocations, except for one or several fractional resource blocks, whose size and position is derived from the number of usable sub-carriers by means of clear rules defined in the standard or indicated to the user equipment via signalling. In addition, the invention introduces ways to inform the user equipment about the number of usable subcarriers. These include inter alia:

1) including the number of usable subcarriers as part of the system information in the broadcast channel (in addition to or instead of the system bandwidth);
2) defining rules that unambiguously relate the number of usable subcarriers to the system bandwidth that is included in the system information on the broadcast channel.

Thus, the present invention allows specifying of one generic physical layer that is easily extendable to various existing and future bandwidth allocations, and further allows signalling support in order to inform a user equipment about the valid resource block allocation in a cell.

DETAILED DESCRIPTION

Figure 1:
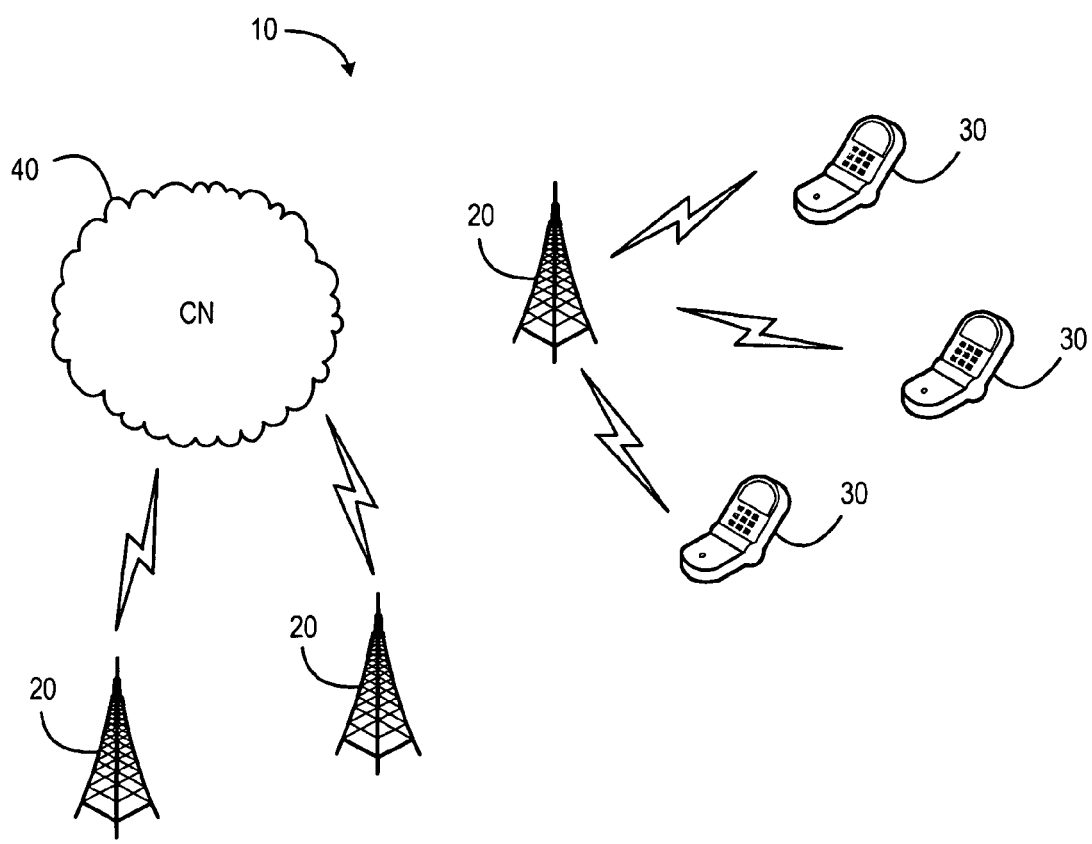
FIG. 1 shows a cellular radio communication network in accordance with an aspect of the invention.

FIG. 1 shows a cellular radio communication network 10. The network 10 comprises a plurality of network units 20, each of which transmits communications to a separate cell in the network 10. Network units 20 are also referred to as base stations in the following description. Within each cell, user equipments (UEs) 30 receive transmissions from the respective network unit 20. Each of the network units 20 receives information from a core network (CN) 40, which controls the operation of the network 10.

In accordance with an aspect of the invention, the available radio spectrum is divided into a number of sub-carriers for downlink transmission, and these sub-carriers can be grouped together such that, during a time period of a known duration, each such group of sub-carriers forms a resource block. One or more resource block can then be allocated for transmissions to each active user equipment. In some presently preferred embodiments, the sub-carriers making up a resource block are adjacent, but this need not be the case. In addition, although the invention is described with reference to the allocation of downlink resource blocks, for transmissions to a user equipment, the same principle can be applied for the allocation of uplink resource blocks, for transmissions to from user equipment.

Figure 2:
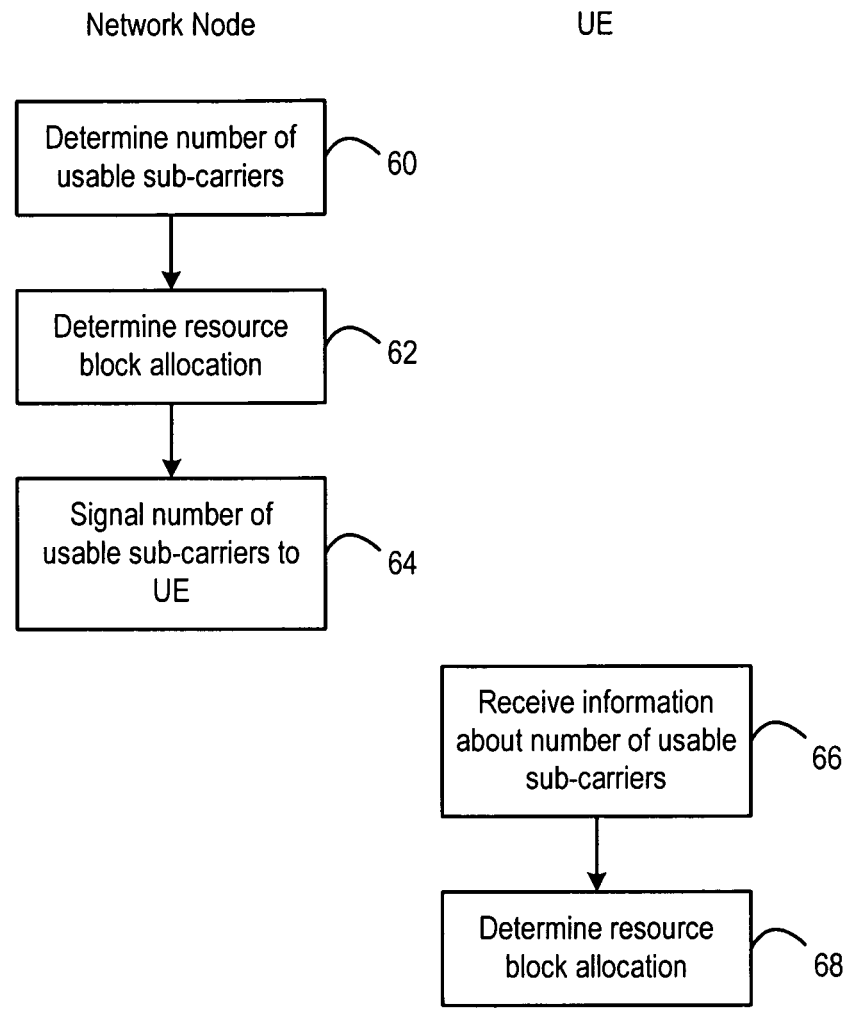
FIG. 2 is a flow chart, illustrating a method in accordance with an aspect of the invention.

FIG. 2 is a flow chart, illustrating steps in methods performed in a network node and in a user equipment according to the present invention.

The steps performed in the network node can for example be performed in a radio access node or in a core network node of the cellular radio communication network 10. In step 60, the network node determines the number of usable sub-carriers at that time. The network node can for example determine this number by determining the usable bandwidth, and dividing this bandwidth by the bandwidth of one sub-carrier.

In step 62, the network node determines the resource block allocation. The resource block allocation can be determined directly from the number of usable sub-carriers according to a set of rules, as will be described in more detail below. In one embodiment of the invention, the set of rules is predefined in the relevant communication standard. In another embodiment of the invention, more than one set of rules is predefined in the standard, and the network node determines the resource block allocation based on a selected one of those sets of rules.

In step 64, the network node signals the number of usable sub-carriers to the user equipment. The number of usable sub-carriers, also referred to below as N can be informed to the user equipment, e.g., on a broadcast control channel as part of the cell system information. The number could be signalled directly or, alternatively, could be signalled indirectly by signalling of, e.g., the upper and lower boundaries of the spectrum allocation.

Where more than one set of rules is predefined in the standard, and the network node determines the resource block allocation based on a selected one of those sets of rules, then the network node must also signal to the user equipment which of those sets of rules was used for determining the resource block allocation.

In step 66, the user equipment receives the information transmitted from the network node indicating the number of usable sub-carriers. Where, for example, the upper and lower boundaries of the spectrum allocation are signalled, the user equipment is able to determine the number of usable sub-carriers by dividing the allocated bandwidth by the bandwidth of one sub-carrier.

The position of the synchronisation channel (SCH) and broadcast channel (BCH) is independent of the number of usable sub-carriers since these channels are accessed before the user equipment has knowledge of the number of usable sub-carriers. Therefore, the exact mapping of synchronisation channel and broadcast channel is not further relevant within the scope of the present invention.

In step 68, the user equipment determines the resource block allocation. As mentioned above, there may only be one set of rules predefined in the relevant communication standard. Alternatively, more than one set of rules may be predefined in the standard, in which case the user equipment will also have received from the network node information indicating which of those sets of rules was used for determining the resource block allocation.

In general terms, embodiments of the invention relate to schemes in which the resource block size is fixed, and the rules determine which of the usable sub-carriers form part of one or more fractional resource blocks (that is, resource blocks that contain fewer sub-carriers than the other resource blocks), and which of the usable sub-carriers are allocated to the fractional resource block, or blocks.

However, it will be appreciated that the rules may define other systems for determining the resource block allocation, based on information about the number of usable sub-carriers.

Figure 3:
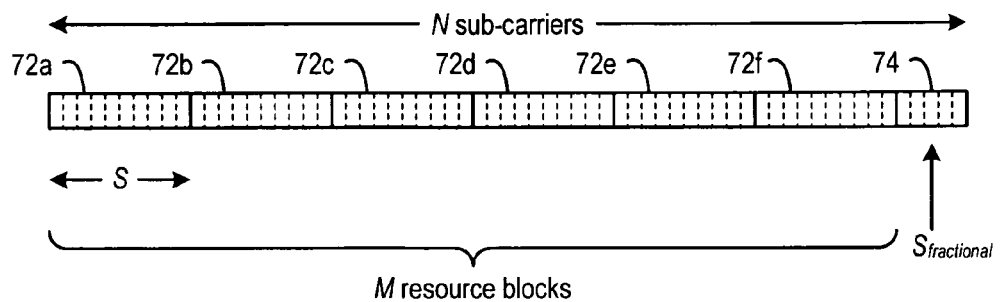
FIG. 3 illustrates a first example of a resource block allocation according to the present invention.

FIG. 3 illustrates a scheme where there is a fractional resource block at the upper edge of the spectrum. Thus, there is predefined a standard size for each resource block. That is, each of the standard resource blocks $72a, \ldots, 72f$ contains a number S of sub-carriers, and there are a number M of these resource blocks (where M is calculated as M=floor(N/S)). Unless N happens to be an integer multiple of S, there are number of sub-carriers that cannot be allocated to one of these standard resource blocks, this number being defined as $S_{fractional}$, where $S_{fractional}=N-M\times S$.

According to the specific rule applied in this case, these sub-carriers are allocated to a fractional resource block 74 on the upper edge of the spectrum.

Figure 4:
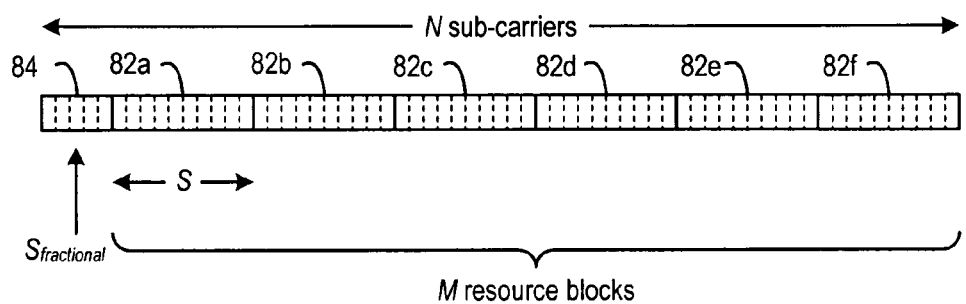
FIG. 4 illustrates a second example of a resource block allocation according to the present invention.

FIG. 4 illustrates a scheme where there is a fractional resource block at the lower edge of the spectrum. Thus, there is again predefined a standard size for each resource block, so that each of the standard resource blocks $82a, \ldots, 82f$ contains a number S of sub-carriers, and there are a number M of these resource blocks (where M is calculated as M=floor (N/S)). Unless N happens to be an integer multiple of S, there are number of sub-carriers that cannot be allocated to one of these standard resource blocks, this number again being defined as $S_{fractional}$, where $S_{fractional}=N-M\times S$.

According to the specific rule applied in this case, these sub-carriers are allocated to a fractional resource block 84 on the lower edge of the spectrum.

Figure 5:
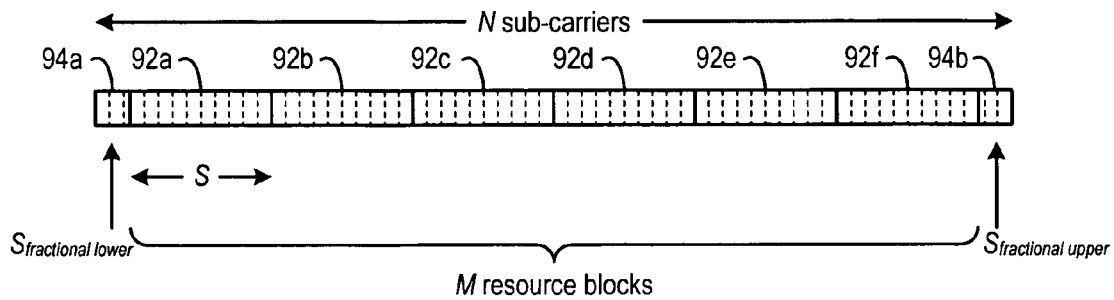
FIG. 5 illustrates a third example of a resource block allocation according to the present invention.

FIG. 5 illustrates a scheme where there are fractional resource blocks at each edge of the spectrum. Thus, there is again predefined a standard size for each resource block, so that each of the standard resource blocks $92a, \ldots, 92f$ contains a number S of sub-carriers, and there are a number M of these resource blocks (where M is calculated as M=floor (N/S)). Unless N happens to be an integer multiple of S, there are number of sub-carriers that cannot be allocated to one of these standard resource blocks, this number again being defined as $S_{fractional}$, where $S_{fractional}=N-M\times S$.

According to the specific rule applied in this case, these sub-carriers are allocated to two fractional resource blocks, namely a fractional resource block 94a on the lower edge of the spectrum and a fractional resource block 94b on the upper edge of the spectrum. These fractional resource blocks contain numbers of sub-carriers $S_{fractional\ lower}$ and $S_{fractional\ upper}$ respectively, where $S_{fractional\ lower}=S_{fractional\ upper}=\frac{1}{2}(N-M\times S)$, assuming that $S_{fractional}$ is an even number. Another rule can define for example that one of these fractional resource blocks contains one more sub-carrier than the other if $S_{fractional}$ is an odd number.

In other embodiments, the rules can define the position of one or more fractional resource blocks at any arbitrary position within the spectrum allocation.

Still other embodiments of the present invention relate to the use of multiple fractional resource blocks, either with identical sizes or with multiple resource block sizes, in a cell in addition to the ordinary sized resource blocks. The information which resource blocks are fractional and of which size each or all fractional resource blocks are, may either be derived from predefined rules in the standard for a given spectrum allocation, or may be informed to the UE via means of signalling.

In any case, the position of the fractional resource block, or blocks, may either be derived from predefined rules in the standard for a given spectrum allocation, or may be informed to the user equipment by means of signalling.

Yet another embodiment within the scope of the present invention allows support for a static resource block allocation, in which each resource block has a size of only one sub-carrier. This would imply that physical layer resource handling needs to be done with a resolution of one sub-carrier (potentially resulting in more need for signalling) and that some resource blocks would have reference signals while others would not have reference signals, but has the advantage that one and the same resource block size would be used in each resource block for each existing or future spectrum allocation without wasting a single subcarrier.

The invention claimed is:

1. A method for supporting a generic physical layer specification in a radio access network, the method comprising:
   determining, from a number of usable subcarriers, which of the usable subcarriers are to be allocated to one or more fractional resource blocks, while maintaining a generic resource block size for the allocation of all other subcarriers; and
   informing a user equipment about the number of usable subcarriers;
   wherein the usable subcarriers span across a defined frequency spectrum; and
   wherein the one or more fractional resource blocks comprise:
      a single fractional resource block at an upper edge of the spectrum;
      a single fractional resource block at a lower edge of the spectrum; or
      a first fractional resource block at the upper edge of the spectrum and a second fractional resource block at the lower edge of the spectrum.

2. The method of claim 1 wherein determining the fractional resource blocks is based on a set of pre-defined rules known to the user equipment.

3. The method of claim 1 wherein determining the fractional resource blocks is based on a set of rules indicated to the user equipment via signaling.

4. The method of claim 1 wherein informing the user equipment about the number of usable subcarriers comprises indicating the number of usable subcarriers in system information broadcast to the user equipment over a broadcast channel.

5. The method of claim 4 wherein informing the user equipment about the number of usable subcarriers comprises defining rules that associate the number of usable subcarriers to the system bandwidth indicated in the broadcasted system information.

6. A method of operating user equipment in a radio access network, the method comprising:
   receiving information from a network indicating a number of usable subcarriers; and
   determining which of the usable subcarriers are to be allocated to at least one fractional resource block while maintaining a generic resource block size for the allocation of all other subcarriers;
   wherein the usable subcarriers span across a defined frequency spectrum; and
   wherein the one or more fractional resource blocks comprise:
      a single fractional resource block at an upper edge of the spectrum;
      a single fractional resource block at a lower edge of the spectrum; or
      a first fractional resource block at the upper edge of the spectrum and a second fractional resource block at the lower edge of the spectrum.

7. The method of claim 6 further comprising determining at least one of a size and a position of the at least one fractional resource block based on a set of pre-defined rules.

8. The method of claim 6 further comprising determining at least one of a size and a position of the at least one fractional resource block based on rules indicated to the user equipment by signaling.

9. The method of claim 6 further comprising receiving said information from the network node as part of system information broadcast over the broadcast channel.

10. The method of claim 9 wherein said information comprises information associated with the system bandwidth, and wherein the user equipment determines the number of usable subcarriers based on a set of rules that associate the number of usable subcarriers to said system bandwidth.

11. A network node in a mobile communications network in which an available bandwidth is divided into subcarriers comprising a number of usable subcarriers, and wherein each of a plurality of resource blocks includes at least one subcarrier allocated for communications between the network and one or more user equipment, the network node configured to:
   determine, from the number of usable subcarriers, a number of subcarriers to be allocated to one or more fractional resource blocks and the position of the one or more fractional resource blocks within the available bandwidth, while maintaining a generic resource block size for the allocation of all other subcarriers; and
   inform a user equipment of the number of usable subcarriers;
   wherein the usable subcarriers span across a defined frequency spectrum; and
   wherein the one or more fractional resource blocks comprise:
      a single fractional resource block at an upper edge of the spectrum;
      a single fractional resource block at a lower edge of the spectrum; or
      a first fractional resource block at the upper edge of the spectrum and a second fractional resource block at the lower edge of the spectrum.

12. The network node of claim 11 wherein the network node is further configured to inform the user equipment about the set of rules for determining the number of subcarriers allocated to the at least one fractional resource block.

13. The network node of claim 11 wherein the network node is further configured to inform the user equipment about the set of rules for determining the position of at least one fractional resource block within the available bandwidth.

14. The network node of claim 11 wherein the network node is further configured to inform the user equipment of the number of usable subcarriers by including the number of usable subcarriers in system information broadcast to the user equipment in a broadcast channel.

15. The network node of claim 11 wherein the network node is further configured to inform the user equipment of the number of usable subcarriers by including information associated with the available bandwidth as part of system information that is broadcast to the user equipment over a broadcast channel, wherein rules associate the number of usable subcarriers to said available bandwidth.

16. A user equipment for use in a mobile communications network having an available bandwidth divided into subcarriers comprising a number of usable subcarriers, and wherein resource blocks, each comprising at least one subcarrier, are allocated for communications between the network and one or more user equipment, the user equipment configured to:
   receive information from the network indicating the number of usable subcarriers; and
   derive, from the number of usable subcarriers, a size and a position of at least one fractional resource block, while maintaining a generic resource block size for the allocation of all other subcarriers;
   wherein the usable subcarriers span across a defined frequency spectrum; and
   wherein the one or more fractional resource blocks comprise:
      a single fractional resource block at an upper edge of the spectrum;
      a single fractional resource block at a lower edge of the spectrum; or
      a first fractional resource block at the upper edge of the spectrum and a second fractional resource block at the lower edge of the spectrum.

17. The user equipment of claim 16 wherein the user equipment is further configured to derive the size and/or the position of the at least one fractional resource block based on a set of predefined rules.

18. The user equipment of claim 16 wherein the user equipment is further configured to:
   receive information from the network indicating a set of rules; and
   derive the size and/or the position of the at least one fractional resource block based on said rules.

19. The user equipment of claim 18 wherein the user equipment is further configured to receive said information indicating the set of rules from the network as part of system information received over a broadcast channel.

20. The user equipment of claim 16 wherein the user equipment is further configured to:
   receive information from the network indicating a system bandwidth; and
   determine the number of usable subcarriers based on rules that associate the number of usable subcarriers to said system bandwidth.

* * * * *